Jan. 26, 1926.　　　G. O. BRITTAIN　　　1,571,086
AIR COOLED ENGINE
Filed April 1, 1924
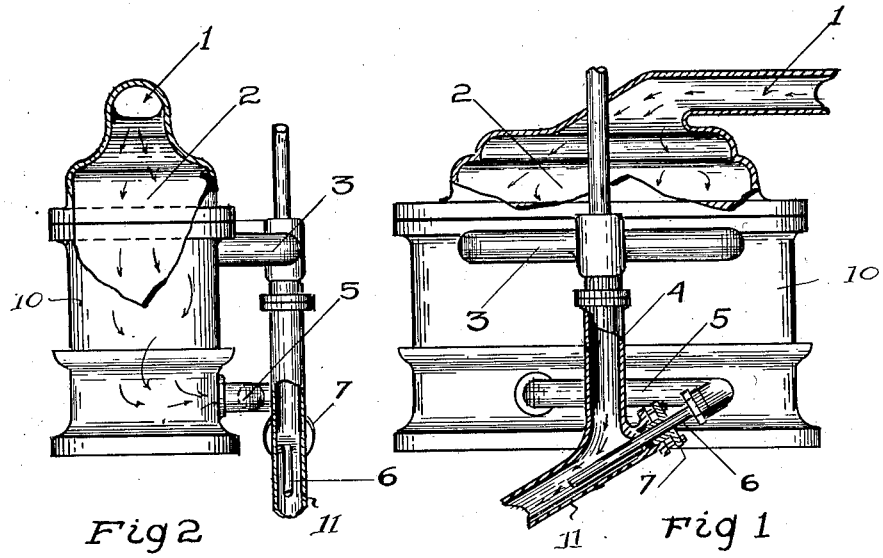
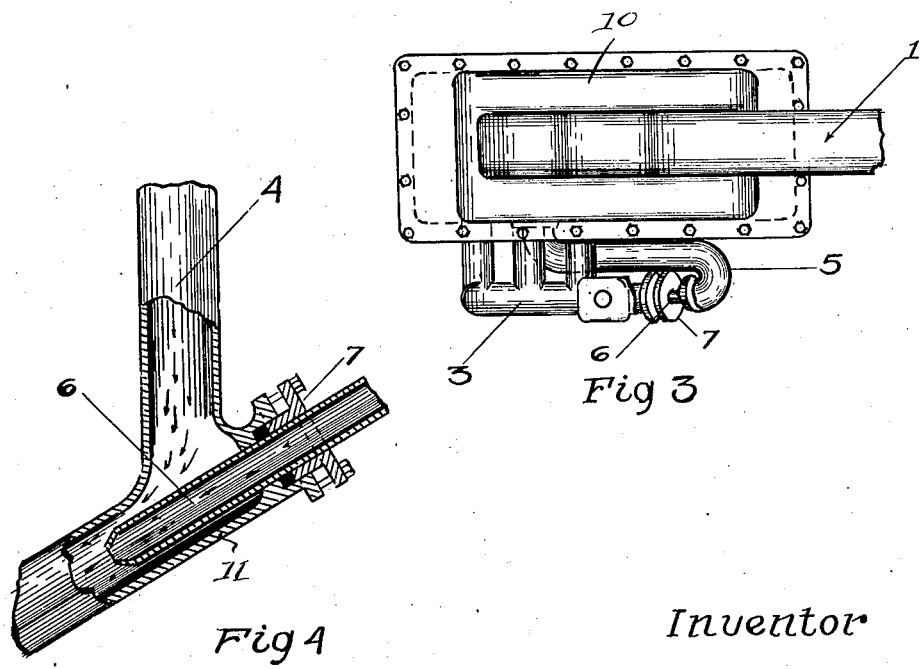
Inventor
G. O. Brittain Patented Jan. 26, 1926.

1,571,086

UNITED STATES PATENT OFFICE.

GUSTAVUS O. BRITTAIN, OF CANTON, OHIO.

AIR-COOLED ENGINE.

Application filed April 1, 1924. Serial No. 703,438.

*To all whom it may concern:*

Be it known that I, GUSTAVUS O. BRITTAIN, a citizen of the United States, residing at Canton, in the county of Stark and State of Ohio, have invented certain new and useful Improvements in Air-Cooled Engines, of which the following is a full, clear, and exact description.

This invention relates to internal combustion engines and particularly to means by which such engines may be cooled. More specifically, the invention relates to the provision of means by which the heat from the engine may be carried off by air in lieu of water which is now in general use in connection with the cooling of internal combustion engines.

An object of the invention resides in the provision of an air cooling system which may be installed on engines having the usual water jacket, air being caused to circulate between the double walls in place of water.

A further object of the invention consists in connecting up the circulating system with the exhaust pipe so as to cause a rapid passage of the cooling air around the engine parts at all times while the engine is running.

Other objects and advantages of the invention will be apparent from the following description when taken in connection with the accompanying drawings in which:

Figure 1 is a side elevation of my novel internal combustion engine and cooling system, parts being broken away to more clearly show the construction.

Figure 2 is an end elevation of the engine, parts also being broken away to show the detail of the construction.

Figure 3 is a plan view of an internal combustion engine and cooling system; and Figure 4 is an enlarged detail of the exhaust pipe and related parts.

Referring to the drawing more in detail the numeral 10 designates an internal combustion engine of usual construction comprising one or more cylinders of the block type and each cylinder being formed of a double wall providing a passage which completely surrounds each cylinder as is usual in all types of water cooled gas engines. The cylinder head is also formed of double walls so as to provide passages for the cooling medium. This construction is well-known and in common use and therefore it has not been thought necessary to show the same in detail on the accompanying drawings.

As hereinbefore stated an object of the present invention is to provide a construction which may be combined with the ordinary water cooled internal combustion engine so as to convert the same into an air cooled engine. To this end I have provided a pipe 1 which communicates at one end with the atmosphere and the other end of which is enlarged into substantially a bell-shape as indicated by the numeral 2, so as to envelop the entire top of the engine and communicate with the passages formed by the double walls of the cylinder head which in turn communicate with the passages surrounding the body of each cylinder.

Communicating with the passages in the side walls of the cylinders is a pipe 5 which is the equivalent of the pipe found in water-cooled engines and which carries the cold water to the passage forming the water jacket. In the present construction this pipe 5 carries the heated air from the air space surrounding the cylinders and has its outer end decreased in diameter as indicated by the numeral 6 so that the same may be positioned in the lateral extension 11 of the exhaust pipe 4 and be secured therein by means of the packing nuts 7.

This engine is provided with the usual exhaust manifold 3 to which is connected the enlarged exhaust pipe 5 which, as just stated, is provided with the lateral extension 11 and from an inspection of Figures 1 and 4 of the drawings it will be noted that the free end of the pipe 6 extends into the lateral extension 11 a sufficient distance to pass beyond the enlarged exhaust pipe 4.

In the operation of the device it will be apparent that the exhaust gases passing rapidly through the manifold 3 and exhaust pipes 4 and 11 will create a suction in the air pipe 5—6 thereby causing air to be drawn from the atmosphere through pipe 1, chamber 2 and the passages surrounding the cylinder head and cylinders, thereby causing a continuous circulation of fresh and cooled air around these parts. While it has not been thought necessary to show the usual fan for aiding in the cooling of internal combustion engines it is obvious that such a fan might well be partly encased so as to direct air to the free end of pipe 1 thus aiding in the circulation of the cooling air through the system.

From the foregoing description taken in connection with the accompanying drawings it will be apparent that I have devised a novel and inexpensive construction by which the ordinary water-jacketed internal combustion engine may be readily converted into an air-cooled engine providing an adequate supply of cold fresh air for maintaining the engine at such temperature as will give the greatest efficiency in operation.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

What I claim as new and desire to secure by Letters Patent is:

An internal combustion engine having one or more cylinders, an exhaust conduit leading from the explosion chamber of said cylinders, said conduit terminating in a lateral extension communicating therewith, each cylinder being formed of a pair of spaced walls providing a passage for a cooling medium on all sides and the top of each cylinder, a pipe having one end communicating with the atmosphere, the other end of said pipe being enlarged and communicating with the passages in the tops of said cylinders, a pipe having one end in communication with the passages in the sides of said cylinders, the other end of said pipe being positioned in the lateral extension of said exhaust conduit and extending beyond the point of communication between the exhaust conduit and its lateral extension, whereby a suction is created in the passages surrounding said cylinders so as to cause a circulation of air.

G. O. BRITTAIN.